United States Patent
Alikhani et al.

(10) Patent No.: US 11,494,449 B2
(45) Date of Patent: Nov. 8, 2022

(54) METHODS AND SYSTEMS FOR FACILITATING SEARCHING OF REGULATORY CONTENT

(71) Applicant: Compliance.ai, San Francisco, CA (US)

(72) Inventors: Kayvan Alikhani, Berkeley, CA (US); Danielle Lee Deibler, San Francisco, CA (US); Christopher Walker, San Francisco, CA (US); Brendan Callahan, San Francisco, CA (US)

(73) Assignee: COMPLIANCE.AI, San Francisco, CA (US)

( * ) Notice: Subject to any disclaimer, the term of this patent is extended or adjusted under 35 U.S.C. 154(b) by 104 days.

(21) Appl. No.: 16/123,917

(22) Filed: Sep. 6, 2018

(65) Prior Publication Data
US 2019/0073427 A1 Mar. 7, 2019

Related U.S. Application Data

(60) Provisional application No. 62/555,181, filed on Sep. 7, 2017.

(51) Int. Cl.
*G06F 16/9535* (2019.01)
*G06F 16/23* (2019.01)
(Continued)

(52) U.S. Cl.
CPC ...... *G06F 16/9535* (2019.01); *G06F 16/2358* (2019.01); *G06F 16/22* (2019.01);
(Continued)

(58) Field of Classification Search
CPC ............ G06F 16/9535; G06F 16/2358; G06F 16/90335; G06F 16/25; G06F 16/22;
(Continued)

(56) References Cited

U.S. PATENT DOCUMENTS 6,289,342 B1 * 9/2001 Lawrence ............ G06F 16/951
707/999.102
6,912,502 B1 * 6/2005 Buddle .................. G06Q 10/10
705/7.41

(Continued)

*Primary Examiner* — Dennis Truong

(57) ABSTRACT

Disclosed is a method of facilitating searching of regulatory content. The method may include receiving, using a communication device, a search request from a user device. Further, the search request may be associated with a user account. Further, the method may include querying, using a storage device, at least one database based on the search request. Further, the method may include receiving, using a processing device, at least one regulatory content from the storage device based on the querying. Further, the method may include retrieving, using the storage device, at least one user characteristic associated with the user account. Further, the method may include generating, using the processing device, at least one personalized regulatory content based on each of the at least one regulatory content and the at least one user characteristic. Further, the method may include transmitting the at least one personalized regulatory content to the user device.

11 Claims, 11 Drawing Sheets

(51) Int. Cl.
*G06F 16/22* (2019.01)
*G06F 16/25* (2019.01)
*G06F 16/903* (2019.01)
*G06Q 10/06* (2012.01)
*G06Q 30/00* (2012.01)
*G06Q 50/18* (2012.01)
*H04L 67/306* (2022.01)

(52) U.S. Cl.
CPC ........ *G06F 16/25* (2019.01); *G06F 16/90335* (2019.01); *G06Q 10/063* (2013.01); *G06Q 10/06315* (2013.01); *G06Q 30/018* (2013.01); *G06Q 50/18* (2013.01); *H04L 67/306* (2013.01)

(58) Field of Classification Search
CPC ........... G06Q 10/06315; G06Q 30/018; G06Q 10/063; G06Q 50/18; G06Q 10/105; G06Q 10/0631; G06Q 50/26; H04L 67/306
See application file for complete search history.

(56) References Cited

U.S. PATENT DOCUMENTS

| | | | | |
|---|---|---|---|---|
| 7,603,358 | B1* | 10/2009 | Anderson | G06F 16/248 |
| 8,606,747 | B2* | 12/2013 | Carrington | G06Q 10/10 |
| | | | | 707/603 |
| 8,751,372 | B1* | 6/2014 | Friedman | G06Q 40/04 |
| | | | | 705/37 |
| 8,799,243 | B1* | 8/2014 | Havlik | G06Q 10/105 |
| | | | | 707/694 |
| 9,058,606 | B1* | 6/2015 | Tulek | G06Q 30/018 |
| 9,123,024 | B2* | 9/2015 | LeVine | G06Q 10/0635 |
| 9,292,623 | B2* | 3/2016 | Walker | G06F 16/258 |
| 9,355,255 | B1* | 5/2016 | King | G06F 21/60 |
| 2004/0015483 | A1* | 1/2004 | Hogan | G06F 16/93 |
| 2004/0107124 | A1* | 6/2004 | Sharpe | G06Q 10/06375 |
| | | | | 705/7.37 |
| 2005/0102173 | A1* | 5/2005 | Barker | G06Q 10/06316 |
| | | | | 705/7.26 |
| 2005/0228688 | A1* | 10/2005 | Visser | G06Q 30/018 |
| | | | | 705/317 |
| 2006/0059137 | A1* | 3/2006 | Walker | G06F 16/25 |
| 2006/0101027 | A1* | 5/2006 | Hotchkiss | G06Q 99/00 |
| 2006/0212486 | A1* | 9/2006 | Kennis | G06Q 40/04 |
| 2009/0177664 | A9* | 7/2009 | Hotchkiss | G06Q 99/00 |
| 2009/0265199 | A1* | 10/2009 | Moerdler | G06Q 10/06311 |
| | | | | 705/7.39 |
| 2009/0265200 | A1* | 10/2009 | Boswell | G06Q 10/06316 |
| | | | | 705/7.39 |
| 2010/0205208 | A1* | 8/2010 | Walker | G06F 16/24556 |
| | | | | 707/811 |
| 2011/0208662 | A1* | 8/2011 | Haunschild | G06Q 30/018 |
| | | | | 705/317 |
| 2012/0221485 | A1* | 8/2012 | Leidner | G06Q 40/08 |
| | | | | 705/36 R |
| 2012/0246098 | A1* | 9/2012 | Chari | G06N 20/00 |
| | | | | 706/12 |
| 2013/0246291 | A1* | 9/2013 | Dick | G06Q 10/00 |
| | | | | 705/317 |
| 2014/0373182 | A1* | 12/2014 | Peri | G06F 21/6245 |
| | | | | 726/30 |
| 2016/0092885 | A1* | 3/2016 | Creager | H04L 67/42 |
| | | | | 705/317 |
| 2016/0203494 | A1* | 7/2016 | Galligan Davila | G06Q 30/018 |
| | | | | 705/317 |
| 2016/0350766 | A1* | 12/2016 | Clark | G06Q 50/18 |
| 2016/0371618 | A1* | 12/2016 | Leidner | G06Q 10/0635 |
| 2017/0236129 | A1* | 8/2017 | Kholkar | G06F 40/30 |
| | | | | 705/317 |
| 2017/0262507 | A1* | 9/2017 | Chandrashekar | G06Q 30/0283 |
| 2018/0137107 | A1* | 5/2018 | Buccapatnam Tirumala | G06K 9/629 |
| 2018/0143975 | A1* | 5/2018 | Casal | G06F 40/58 |
| 2018/0189699 | A1* | 7/2018 | Lecourt | G06F 16/31 |
| 2018/0316571 | A1* | 11/2018 | Andrade | H04L 67/22 |

* cited by examiner

METHODS AND SYSTEMS FOR FACILITATING SEARCHING OF REGULATORY CONTENT

The current application claims a priority to the U.S. Provisional Patent application Ser. No. 62/555,181 filed on Sep. 7, 2017.

FIELD OF THE INVENTION

The present disclosure generally relates to the field of information research. More specifically, the present disclosure relates to methods and systems for searching regulatory content.

BACKGROUND OF THE INVENTION

In today's world, data is continuously generated and updated. In other words, the modern world is dealing with big data. In the information age, the ability to effectively perform research has turned out to be very critical, especially while researching for regulations. For example, the regulations may be related to statutory instruments. It is becoming difficult to search for specific regulatory topics and track the changes in the various regulations, as these regulations are often updated.

Further, various researching tools and services are widely available which are constantly evolving. One such researching tool may include a search engine. The search engine is a program that searches for and identifies items in one or more databases that correspond to keywords or characters specified by a user. The search engines provide search results after discovering, analyzing, and retrieving relevant information stored in huge databases. However, the available search engines are not specifically designed to be used for researching content related to regulations. Also, since the regulatory content is updated very often, there is no such service that can provide insights into the updates related to regulations.

Therefore, there is a need for providing methods and systems that help users to effectively and efficiently perform searches for content related to regulations that may overcome one or more of the above-mentioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a system for facilitating searching of regulatory content is also disclosed. The system may include a communication device configured for receiving a search request from a user device. Further, the search request may be associated with a user account. Further, the communication device may be configured for transmitting at least one personalized regulatory content to the user device. Further, the system may include a storage device configured for querying at least one database based on the search request. Further, the storage device may be configured for retrieving at least one user characteristic associated with the user account. Further, the system may include a processing device configured for receiving at least one regulatory content from the storage device based on the querying. Further, the processing device may be configured for generating the at least one personalized regulatory content based on each of the at least one regulatory content and the at least one user characteristic.

Further, according to some embodiments, a method of facilitating searching of regulatory content is disclosed. The method may include receiving, using a communication device, a search request from a user device. Further, the search request may be associated with a user account. Further, the method may include querying, using a storage device, at least one database based on the search request. Further, the method may include receiving, using a processing device, at least one regulatory content from the storage device based on the querying. Further, the method may include retrieving, using the storage device, at least one user characteristic associated with the user account. Further, the method may include generating, using the processing device, at least one personalized regulatory content based on each of the at least one regulatory content and the at least one user characteristic. Further, the method may include transmitting, using the communication device, the at least one personalized regulatory content to the user device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
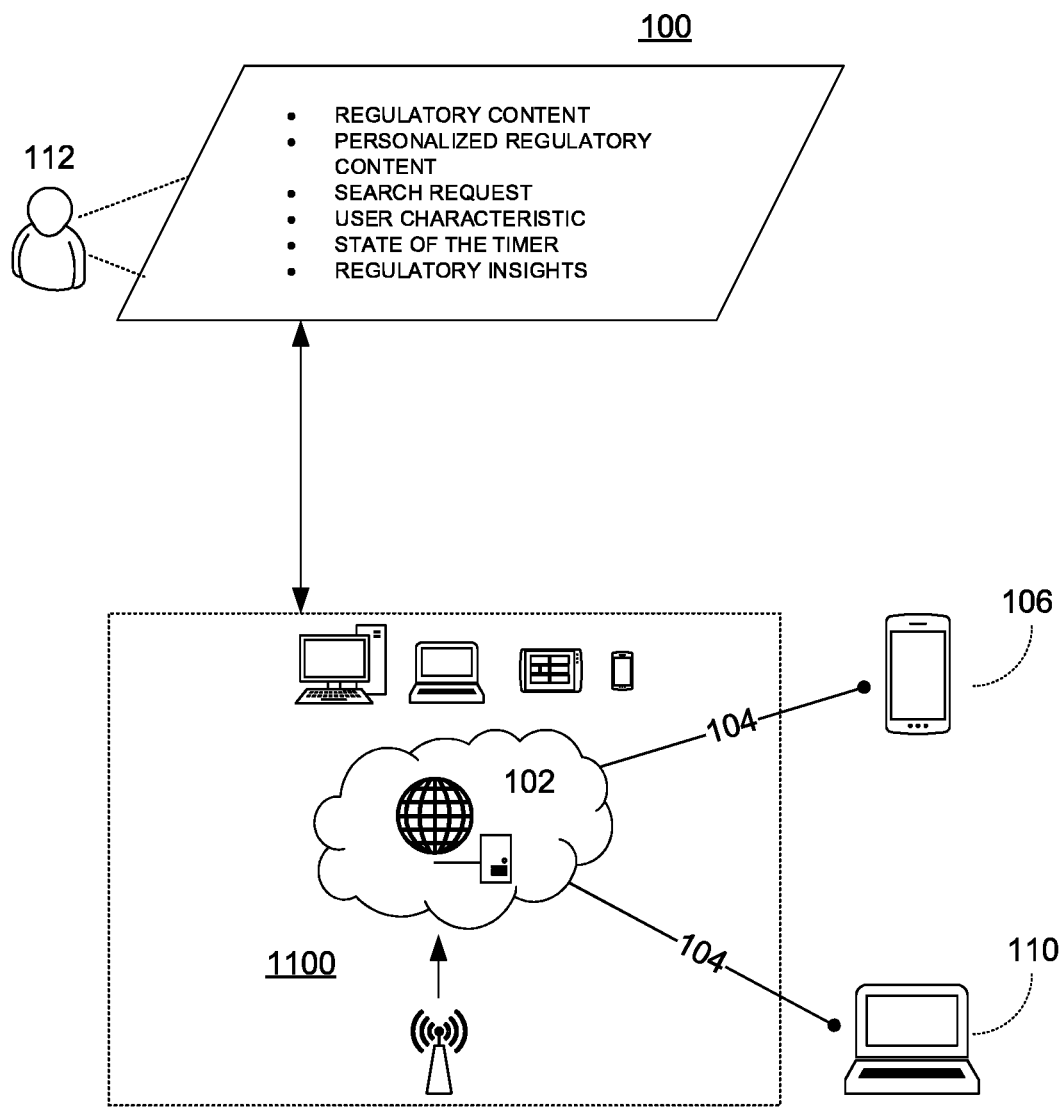
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header. The present disclosure includes many aspects and features. Moreover, while many aspects and features relate to, and are described in the context of searching content, embodiments of the present disclosure are not limited to use only in this context.

Overview

According to some aspects, a method and system are disclosed that provide a regulatory research toolbar. The regulatory research toolbar may be embedded within any application or a web-based service. Accordingly, the regulatory research toolbar may allow a user to research regulatory content from any application or web-based service. For example, the regulatory research toolbar may be embedded within an Internet Browser, such as Google Chrome™, Internet Explorer™, Mozilla Firefox™, and Safari™.

According to further aspects, the regulatory research toolbar may be downloaded by the user as an external plugin. The user may grant permission to the external plugin to integrate with the user's Internet browser. In an instance, the regulatory research toolbar may appear on a home screen of the Internet browser. In another instance, the regulatory research toolbar may also be available in the form of a browser extension (for example, a Google Chrome™ extension).

According to some aspects, a user may provide a full name (or partial name) of a regulation or a regulatory topic of interest. For example, the user may provide key-words related to the regulation. Further, upon providing all required details, the user may submit a search request via the regulatory research toolbar. Further, the regulatory research toolbar may auto-submit the search request if there is a pause or no-input is received for a predetermined time period, such as 2 seconds.

According to further aspects, a backend system or a sub-component service may process the search request. Further, the backend system may compile the research-result blocks by automatically collecting content (related to a researched regulation or regulatory topic) from dissimilar sources, and then personalizing a response based upon the user's profile, their organization tier, behavior, and preferences from other users within a similar asset-tier or charter class as that of a current user.

According to further aspects, the regulatory research toolbar may allow users to get an insightful collection of search results. The search results may be presented in a results window showing multiple blocks of content. The multiple blocks of content may display insightful information associated with a regulation. For instance, there may be result blocks displaying one or more of a number of publications for a specific regulatory topic, summary of a regulatory topic (along with associated key dates), summary of latest changes associated with a regulatory topic, and a heat-map graph associated with a regulatory topic. Further, there may be a result block that shows a number of people who have recently reviewed a regulatory topic over the past 'X' days, and links to top 'Y' regulatory documents related to a researched regulation or regulatory topic.

According to further aspects, the regulatory research toolbar may provide an embeddable and auto-updated block of relevant documents, summaries, insights, trends for a researched regulation or regulatory topic of interest.

According to further aspects, the users may save or link to a result block, upon which, the result block may be automatically updated as new changes are published to a specific regulatory topic. Further, the users may request to be notified if changes occur to a result block.

FIG. 1 is an illustration of an online platform 100 consistent with various embodiments of the present disclosure. By way of non-limiting example, the online platform 100 for facilitating searching of regulatory content may be hosted on a centralized server 102, such as, for example, a cloud computing service. The centralized server 102 may communicate with other network entities, such as, for example, a mobile device 106 (such as a smartphone, a laptop, a tablet computer etc.) and other electronic devices 110 (such as desktop computers, server computers etc.) over a communication network 104, such as, but not limited to, the Internet. Further, the users of the platform 100 may include relevant parties such as one or more of lawyers, attorneys, researchers, paralegals and other users. Accordingly, electronic devices operated by the one or more relevant parties may be in communication with the platform 100. For example, the mobile device 106 may be operated by a lawyer who is trying to research for some bank regulations in the US.

A user 112, such as the one or more relevant parties, may access platform 100 through a web-based software application or browser. The web-based software application may be embodied as, for example, but not be limited to, a website, a web application, a desktop application, and a mobile application compatible with a computing device 1100.

Figure 2:
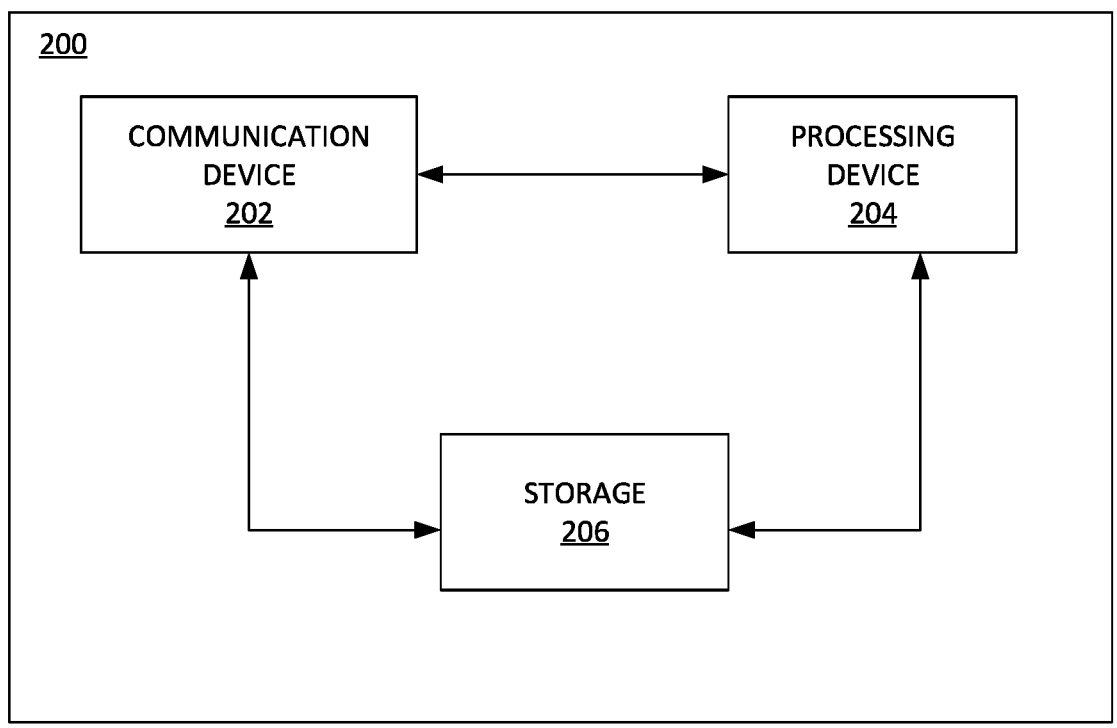
FIG. 2 is a block diagram of a system of facilitating searching of regulatory content, in accordance with some embodiments.

FIG. 2 is a block diagram of a system 200 of facilitating searching of regulatory content, in accordance with some embodiments. The system 200 may include a communication device 202 configured for receiving a search request from a user device. Further, the search request may be associated with a user account. In some embodiments, the search request may include at least one of a name and a topic corresponding to at least one regulation. Further, the communication device 202 may be configured for transmitting at least one personalized regulatory content to the user device. Further, the system 200 may include a storage device 206 configured for querying at least one database based on the search request. Further, the storage device 206 may be configured for retrieving at least one user characteristic associated with the user account. In some embodiments, the at least one user characteristic may be based on a user profile and previous user behavior associated with the user account.

Further, the system 200 may include a processing device 204 configured for receiving at least one regulatory content from the storage device 206 based on the querying. Further, the processing device 204 may be configured for generating at least one personalized regulatory content based on each of the at least one regulatory content and the at least one user characteristic.

In some embodiments, the processing device 204 may be further configured for initiating a timer upon receiving the search request. Further, the processing device 204 may be configured for detecting expiry of a predetermined time period based on a state of the timer. Further, the querying of the at least one database may be based on the detecting.

In some embodiments, the at least one database may include a plurality of dissimilar databases. Further, the system 200 further may include transmitting the search request to each of the plurality of dissimilar databases.

In some embodiments, the at least one user characteristic may be based on at least one preference associated with at least one other user account. Further, the user account and the at least one other user account share at least one common characteristic. In some embodiments, the at least one common characteristic may include a tier level of an organization.

In some embodiments, the communication device 202 may be further configured for receiving user interaction data associated with the at least one regulatory content from a plurality of user devices. Further, the communication device 202 may be configured for transmitting at least one regulatory insight to the user device. Further, the processing device 204 may be further configured for generating the at least one regulatory insight based on the user interaction data.

In some embodiments, the at least one regulatory insight may include a heat map graph associated with the at least one regulatory content.

In some embodiments, the processing device 204 may be further configured for analyzing the at least one regulatory content. Further, the processing device 204 may be configured for generating at least one regulatory insight based on the analyzing.

In some embodiments, the at least one regulatory insight may include one or more of a number of publications associated a regulatory topic corresponding to the at least one regulatory content, a summary of the regulatory topic, key dates associated with the regulatory topic, a summary of latest changes associated with the regulatory topic.

In some embodiments, the communication device 202 may be further configured for receiving, using the communication, a notification request corresponding to the at least one regulatory insight. Further, the communication device 202 may be configured for transmitting at least one updated regulatory insight to the user device. Further, the processing device 204 may be further configured for monitoring at least one change associated with the at least one regulatory insight. Further, the processing device 204 may be configured for generating the at least one updated regulatory insight based on the at least one change.

Figure 3:
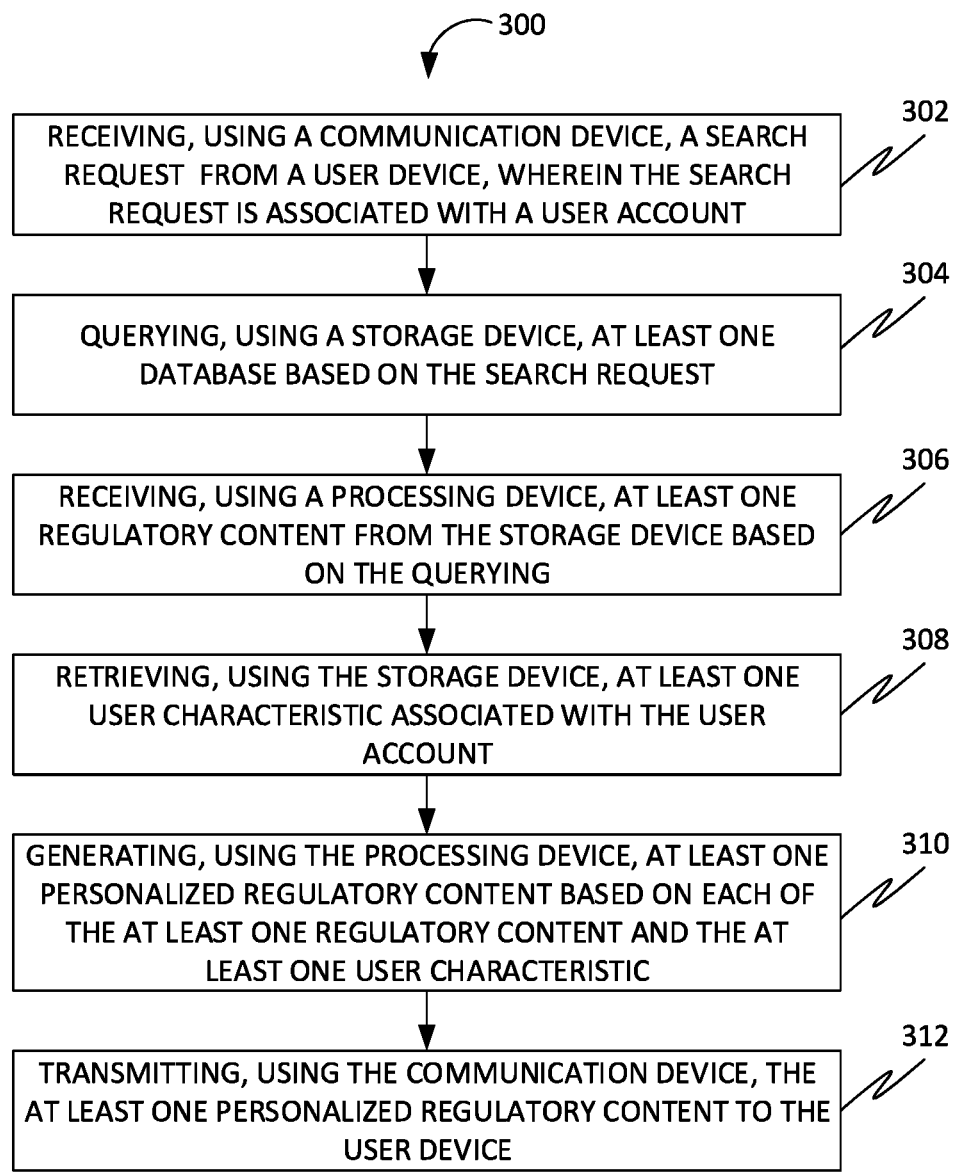
FIG. 3 is a flowchart of a method of facilitating searching of regulatory content, in accordance with some embodiments.

FIG. 3 is a flowchart of a method 300 of facilitating searching of regulatory content, in accordance with some embodiments. At 302, the method 300 may include receiving, using a communication device (such as the communication device 202), a search request from a user device. Further, the search request may be associated with a user account. In some embodiments, the search request may include at least one of a name and a topic corresponding to at least one regulation.

Further, at 304, the method 300 may include querying, using a storage device (such as the storage device 206), at least one database based on the search request. Further, at 306, the method 300 may include receiving, using a processing device (such as the processing device 204), at least one regulatory content from the storage device (such as the storage device 206) based on the querying.

Further, at 308, the method 300 may include retrieving, using the storage device, at least one user characteristic associated with the user account. In some embodiments, the at least one user characteristic may be based on a user profile and previous user behavior associated with the user account.

In some embodiments, the at least one user characteristic may be based on at least one preference associated with at least one other user account. Further, the user account and the at least one other user account share at least one common characteristic. In some embodiments, the at least one common characteristic comprises a tier level of an organization.

Further, at 310, the method 300 may include generating, using the processing device, at least one personalized regulatory content based on each of the at least one regulatory content and the at least one user characteristic. Further, the at least one personalized regulatory content may include relationships between one or more documents.

Thereafter, at 312, the method 300 may include transmitting, using the communication device, the at least one personalized regulatory content to the user device.

Figure 4:
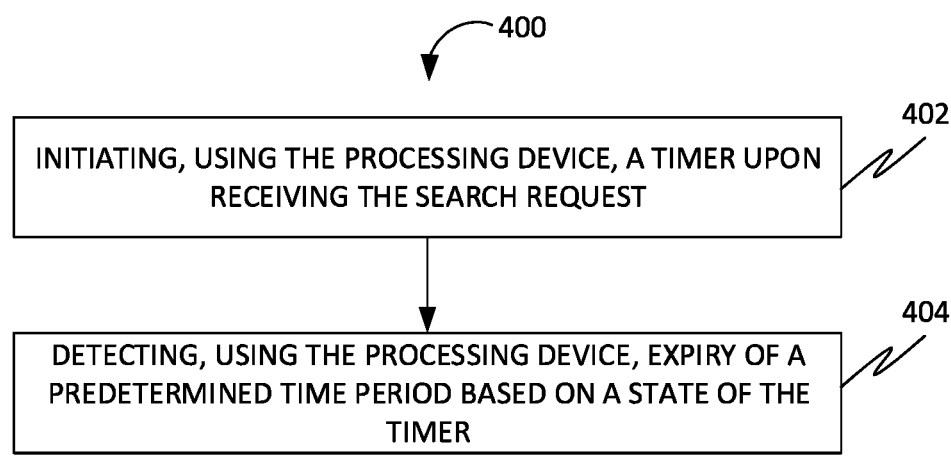
FIG. 4 is a flowchart of a method of performing a time-bound search, in accordance with some embodiments.

FIG. 4 is a flowchart of a method 400 of performing a time-bound search, in accordance with some embodiments. At 402, the method 400 may include initiating, using the processing device, a timer upon receiving the search request. Thereafter, at 404, the method 400 may include detecting, using the processing device, expiry of a predetermined time period based on a state of the timer. Further, the querying of the at least one database may be based on the detecting.

In some embodiments, the at least one database may include a plurality of dissimilar databases. Further, the method further may include transmitting, using the communication device, the search request to each of the plurality of dissimilar databases.

Figure 5:
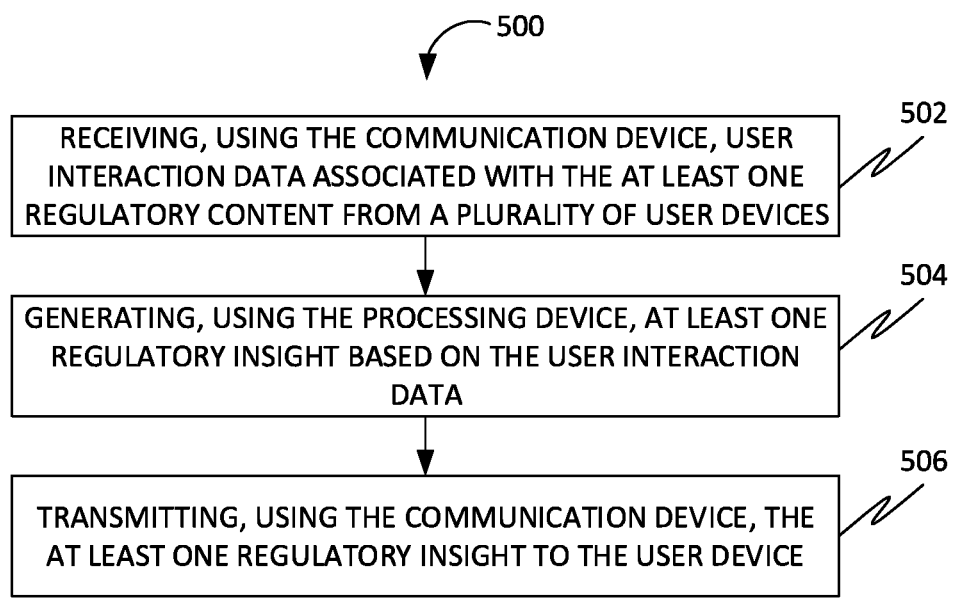
FIG. 5 is a flowchart of a method of obtaining at least one regulatory insight, in accordance with some embodiments.

FIG. 5 is a flowchart of a method 500 of obtaining at least one regulatory insight, in accordance with some embodiments. At 502, the method 500 may include receiving, using the communication device, user interaction data associated with the at least one regulatory content from a plurality of user devices. Further, at 504, the method 500 may include generating, using the processing device, at least one regulatory insight based on the user interaction data. Further, at 506, the method 500 may include transmitting, using the communication device, the at least one regulatory insight to the user device.

In some embodiments, the at least one regulatory insight may include a heat map graph associated with the at least one regulatory content.

Figure 6:
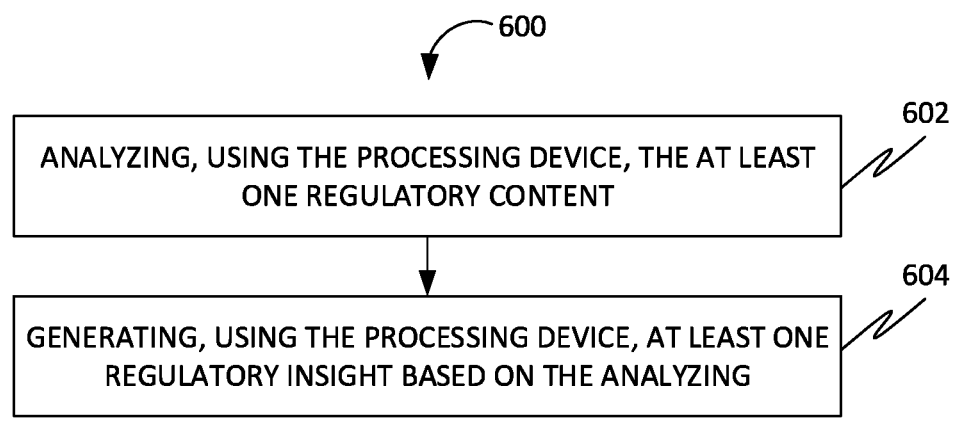
FIG. 6 is a flowchart of a method of obtaining at least one regulatory insight, in accordance with some embodiments.

FIG. 6 is a flowchart of a method 600 of obtaining at least one regulatory insight, in accordance with some embodiments. At 602, the method 600 may include analyzing, using the processing device, the at least one regulatory content. Further, at 604, the method 600 may include generating, using the processing device, at least one regulatory insight based on the analyzing.

In some embodiments, the at least one regulatory insight may include one or more of a number of publications associated a regulatory topic corresponding to the at least one regulatory content, a summary of the regulatory topic, key dates associated with the regulatory topic, a summary of latest changes associated with the regulatory topic.

Figure 7:
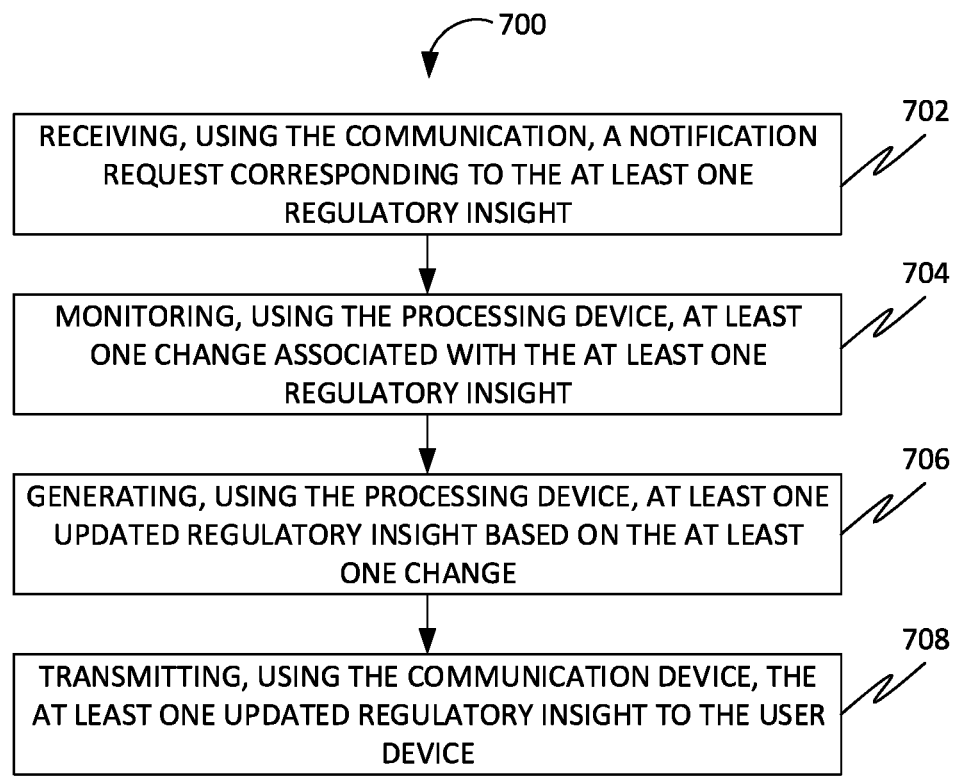
FIG. 7 is a flowchart of a method of updating the at least one regulatory insight, in accordance with some embodiments.

FIG. 7 is a flowchart of a method 700 of updating the at least one regulatory insight, in accordance with some embodiments. At 702, the method 700 may include receiving, using the communication, a notification request corresponding to the at least one regulatory insight. Further, at 704, the method 700 may include monitoring, using the processing device, at least one change associated with the at least one regulatory insight. At 706, the method 700 may include generating, using the processing device, at least one updated regulatory insight based on the at least one change. At 708, the method 700 may include transmitting, using the communication device, the at least one updated regulatory insight to the user device.

According to some aspects, a regulatory research toolbar may be embedded within any application or a web-based service. Accordingly, the regulatory research toolbar may allow a user to research regulatory content from any application or web-based service. For example, the regulatory research toolbar may be embedded within an Internet Browser, such as Google Chrome™, Internet Explorer™, Mozilla Firefox™, and Safari™.

Figure 8:
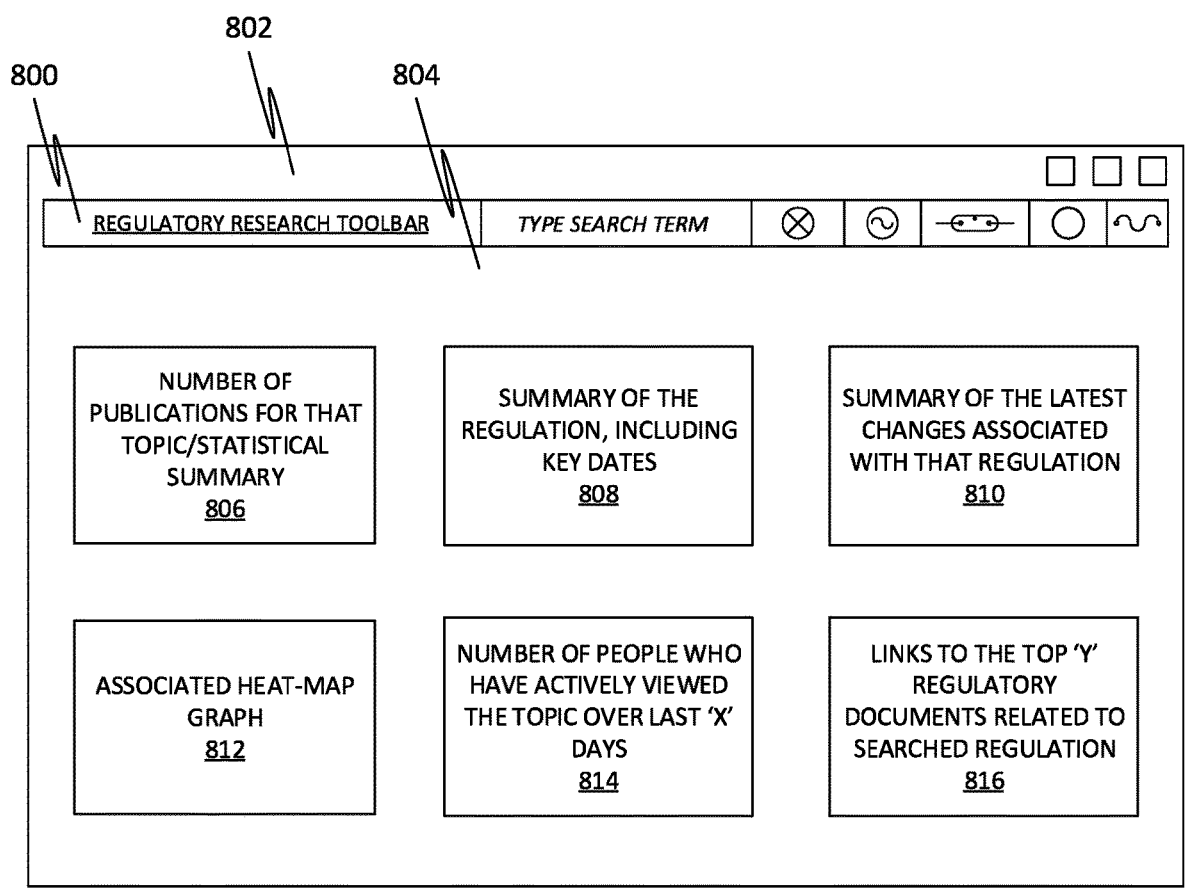
FIG. 8 shows a regulatory research toolbar embedded within an Internet browser, in accordance with an exemplary embodiment.

FIG. 8 shows a regulatory research toolbar 800 embedded within an Internet browser 802, in accordance with an exemplary embodiment. A user may provide search queries (related to a regulatory topic) to the regulatory research toolbar 800. Then, the regulatory research toolbar 800 sends the search query to a backend system which provides search results to the regulatory research toolbar 800. The backend system is explained in further detail in conjunction with FIG. 9 below. Thereafter, the regulatory research toolbar 800 may display the search results. The regulatory research toolbar 800 may present the search results as a composite collection of result blocks in a results window 804. Each result block may contain an important detail regarding the searched regulatory topic. As shown in FIG. 8, six result blocks 806-816 may be displayed in the results window 804. The one or more of the results blocks 806-816 may be embedded in third party systems such as a document management system, website, etc. The embedded result blocks may be dynamically updated by the backend system.

According to some aspects, the results window 804 may include a first result block 806 that may display a number of located publications for the searched regulatory topic. For example, if the user searches for financial regulation of securities products, the first result block may display the number of publications that are related to for financial regulation of securities products.

According to further aspects, the results window 804 may include a second result block 808 that may display a summary of the regulation topic of interest. Further, the key dates associated with a regulation may also be displayed. For example, if the user (such as an employer) searches for employee pension scheme via the regulatory research toolbar 800, the second result block may display a timeline of recent amendments (including key dates) associated with the employee pension scheme along with a summary.

According to further aspects, the results window 804 may include a third result block 810 that may display a summary of latest changes associated with the regulation topic. For example, if the user (such as a banker) searches for bank regulation, the third result block may present a summary describing recent amendments related to the bank regulation.

According to further aspects, the results window 804 may include a fourth result block 812 that may display an associated heat map to show the activity within a geographical location. In an instance, a heat-map graph may show the activity related to the searched regulation topic in and around a particular location. In another instance, the heat-map graph may show the activity related to a publisher.

According to further aspects, the results window 804 may include a fifth result block 814 that may display a number of people who have actively viewed the topic over the last 'X' days, wherein 'X' is a whole number. For example, if the user searches for a regulation topic related to insurance regulation that may have been searched by 50 other people over the last 10 days, then the fifth result block may indicate that 50 people viewed the same regulation topic as viewed by the user in the last 10 days.

According to further aspects, the results window 804 may also include a sixth result block 816 that may contain links to a top 'Y' regulatory documents related to a researched regulation topic, wherein 'Y' is a whole number. In an instance, the research-result block may show 5 links (as default) related to the researched regulation topic.

Similarly, the results window 804 may contain more result blocks to show more information to the user.

Further, the regulatory research toolbar 800 may provide an option to save and link the search results. In some aspects, an auto-update feature may also be integrated into the regulatory research toolbar 800. When activated, the auto-update feature may automatically update the corresponding result block as new changes are published or applied to the searched topic.

Figure 9:
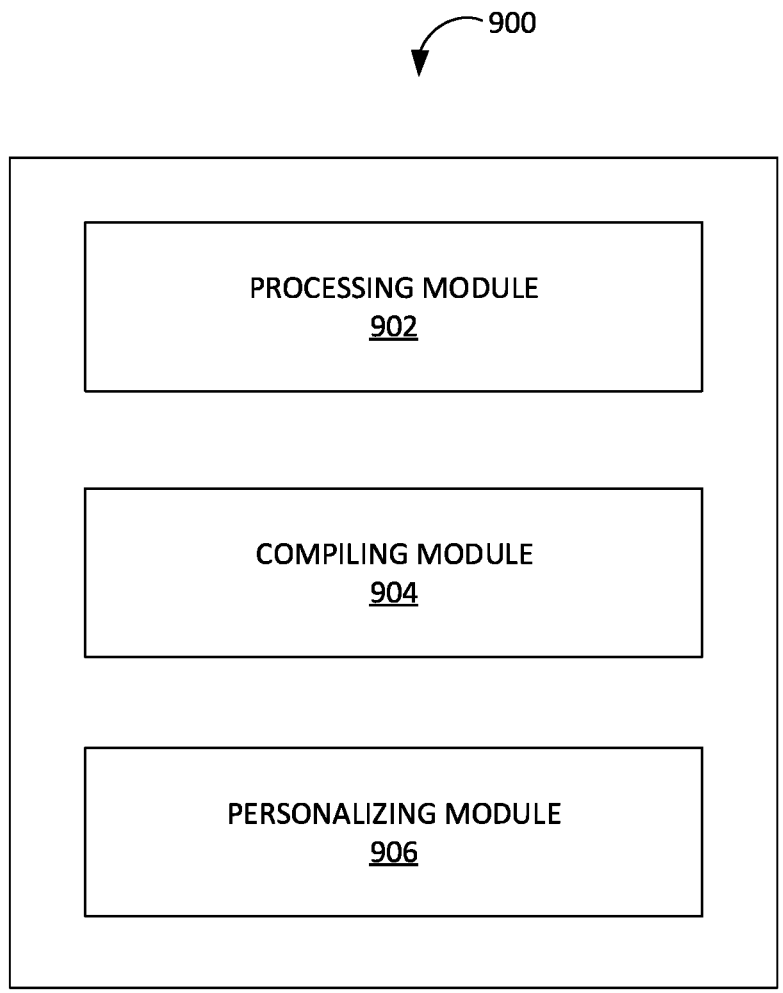
FIG. 9 is a block diagram of a backend system for the regulatory research toolbar, in accordance with some embodiments.

FIG. 9 is a block diagram of a backend system 900 for the regulatory research toolbar 800, in accordance with some embodiments. The backend system 900 may include a processing module 902, a compiling module 904, and a personalizing module 906. Once a user (such as a researcher) submits a search request with the regulatory research toolbar, the processing module 902 may process the search request. The processing module 902 which may be a sub-component service. In some aspects, the processing module 902 may also implement rules and conditions.

Further, the compiling module 904 may compile search results by automatically collecting content from dissimilar sources of such content. In some aspects, the compiling module 904 may collect content related to a regulatory topic form various sources, and then compile the search results based on the various results blocks, explained in further detail in conjunction with FIG. 8 above.

Thereafter, the personalizing module 906 may personalize the search results based on the user's profile. For example, if a user is an accountant, then the search results related to accountants may be ranked higher and shown more prominently. Similarly, the search results may also be personalized based upon the user's preferences, organization tier, behavior and preferences of users within a similar asset-tier or charter class as that of a current user.

According to some aspects, the backend system 900 may be hosted on a server, such as the centralized server 102.

According to further aspects, the backend system 900 may analyze a search history of the user, and then may configure a frontend to dynamically adjust the regulatory research toolbar 800. For example, the backend system 900 may optimize number and configuration of toolbar buttons that are displayed on the regulatory research toolbar 800. The configuration may be performed based on amount of space available or allotted to the regulatory research toolbar 800 on a display screen.

According to some aspects, the backend system may also maintain a log of the results obtained. In some cases, the backend system may also have a feature to automatically bookmark search results that have been searched for more than "n" times.

Further, the backend system 900 may be configured to obtain documents related to regulations, enforcements etc. from multiple resources. The backend system 900 may include a Neuro-Linguistic Programming (NLP) engine to process the documents obtained. The NLP engine may use machine learning to process and learn from the obtained documents. Further, the NLP engine may classify the obtained documents in to multiple classes. Moreover, the NLP engine may find and record relationships between the obtained documents and other documents in a document corpus maintained by the backend system 900.

Further, the NLP engine may process the regulatory documents and generate documents that are easy to understand by the casual users.

Figure 10:
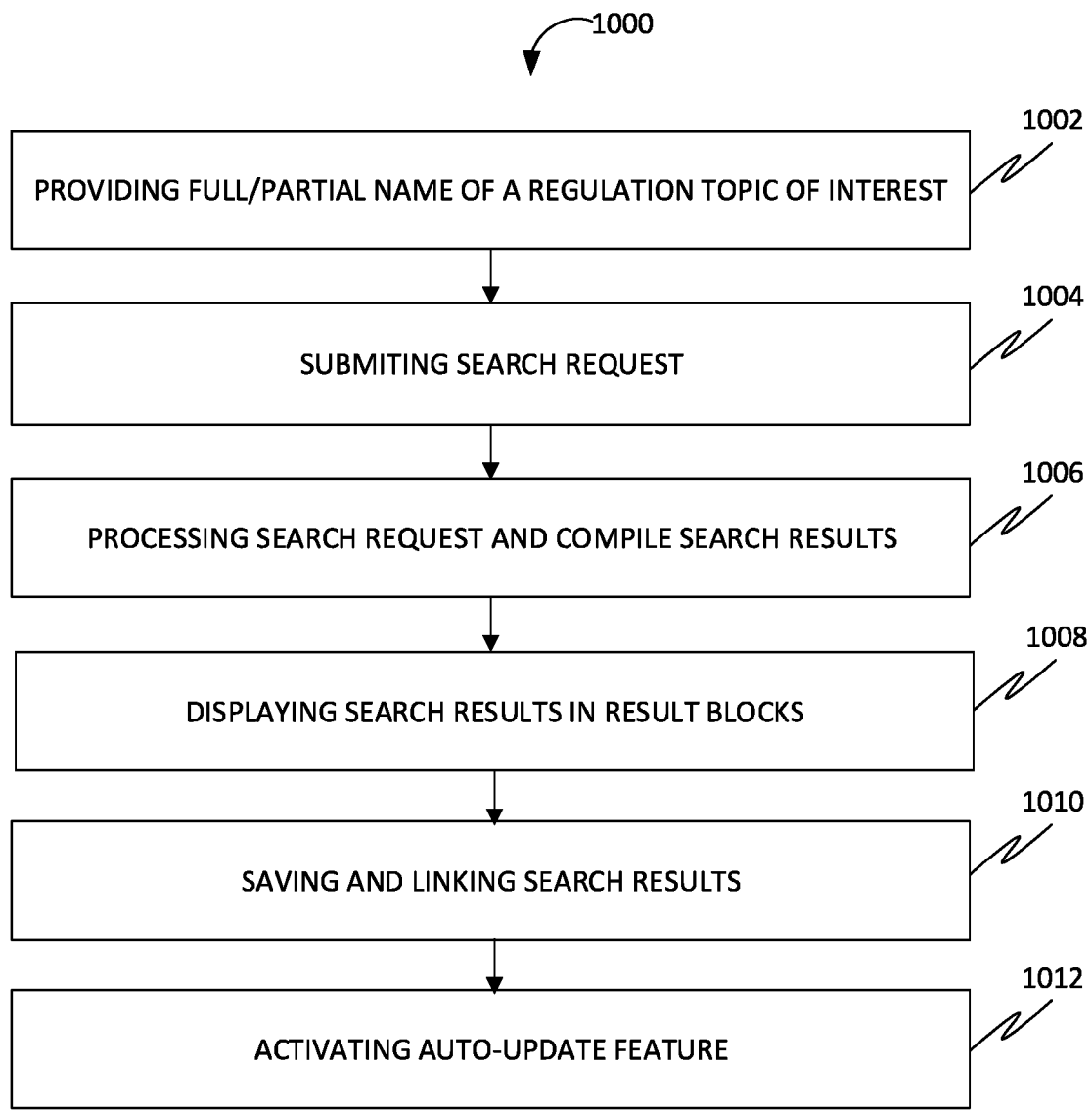
FIG. 10 is a flowchart of a method for researching a regulation topic of interest using the regulatory research toolbar, in accordance with some embodiments.

FIG. 10 is a flowchart of a method 1000 for researching a regulation topic of interest using the regulatory research toolbar, in accordance with some embodiments. At 1002, the method 1000 includes a user (such as a researcher) providing a search query that may include a full or a partial name of a regulation topic of interest in the regulatory research toolbar. For example, the user may input a string of text. Then, the user may submit the search request at 1004. The regulatory research toolbar 800 may then send the search request to the backend system 900.

Thereafter, at 1006, the method 1000 may include the backend system 900 processing the search request and compiling search results by automatically collecting content from dissimilar sources of such content. This may include retrieving information from one or more databases.

Next, at 1008, the method 1000 may include the regulatory research toolbar 800 displaying the search results in one or more result blocks, such as the six blocks of the regulatory research toolbar 800. The user may access the search results on either one of a mobile device 106 (such as a smartphone, a laptop, a tablet computer etc.) and other electronic devices 110 (such as desktop computers, server computers etc.).

Thereafter, at 1010, the method 1000 may include the user saving and linking the search results. Further, at 1012, the method 1000 may include the user activating the auto-update feature such that the regulatory research toolbar 800 automatically update the search results as new changes are published or applied to the searched topic.

In some aspects, the user may also choose to filter the search results on the basis of her preferences. For example, the research regulatory toolbar 800 may contain a preferences button, which upon being clicked, may display a number of options that may appear in form of checkboxes. Then, the user may check and uncheck checkbox options to filter the search results accordingly.

Figure 11:
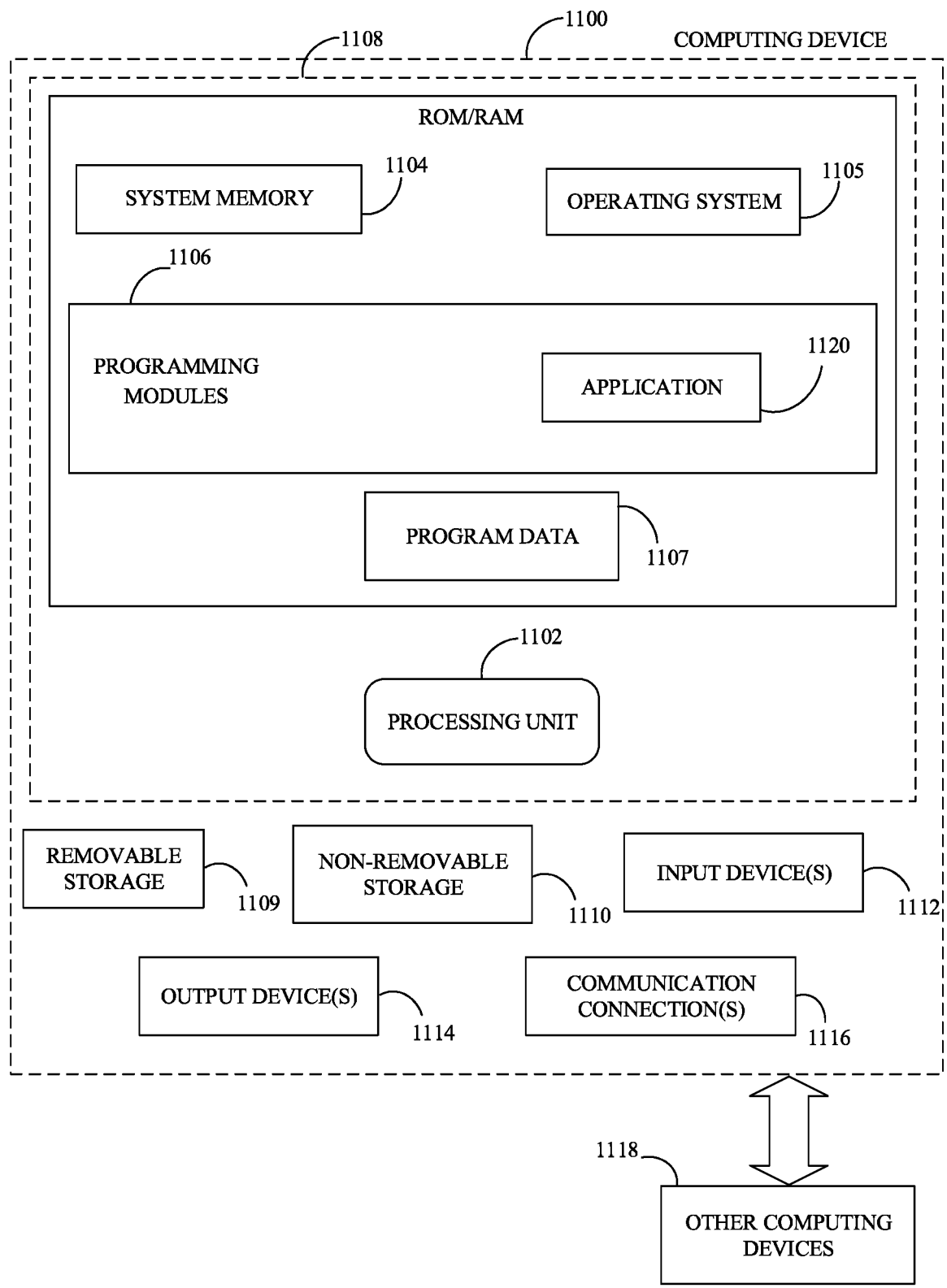
FIG. 11 is a block diagram of a computing device for implementing the methods disclosed herein, in accordance with some embodiments.

With reference to FIG. 11, a system consistent with an embodiment of the disclosure may include a computing device or cloud service, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination. System memory 1104 may include operating system 1105, one or more programming modules 1106, and may include a program data 1107. Operating system 1105, for example, may be suitable for controlling computing device 1100's operation. In one embodiment, programming modules 1106 may include a machine learning module. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and nonvolatile, removable and non-removable media implemented in any method or technology for storage of information, such as computer-readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, a location sensor, a camera, a biometric sensor, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1104, including operating system 1105. While executing on processing unit 1102, programming modules 1106 (e.g., application 1120 such as a media player) may perform processes including, for example, one or more stages of methods 300-700, 1000, algorithms, systems, applications, servers, databases as described above. The aforementioned process is an example, and processing unit 1102 may perform other processes. Other programming modules that may be used in accordance with embodiments of the present disclosure may include machine learning application etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A method of facilitating searching of regulatory content, the method comprising:
   receiving, using a communication device, a search request from a user device, wherein the search request is associated with a user account;
   initiating, using the processing device, a timer upon receiving the search request;
   querying, using a storage device, at least one database based on the search request;
   detecting, using the processing device, expiry of a predetermined time period based on a state of the timer, wherein the querying of the at least one database is based on the detecting;
   receiving, using a processing device, at least one regulatory content from the storage device based on the querying;
   analyzing, using the processing device, the at least one regulatory content;
   generating, using the processing device, at least one regulatory insight based on the analyzing;
   wherein the at least one regulatory insight comprises a number of publications associated with a regulatory topic corresponding to the at least one regulatory content, a summary of the regulatory topic, key dates associated with the regulatory topic, a summary of latest changes associated with the regulatory topic, and a heat map graph associated with the at least one regulatory content;
   retrieving, using the storage device, at least one user characteristic associated with the user account;
   generating, using the processing device, at least one personalized regulatory content based on each of the at least one regulatory content and the at least one user characteristic, wherein the processing device obtains documents related to regulations from multiple resources, and wherein the processing device includes a Neuro-Linguistic Programming (NLP) engine to process the documents obtained, and wherein the NLP engine uses a machine learning to process and learn from the obtained documents, and wherein the NLP engine classifies the obtained documents into multiple classes, and wherein the NLP engine finds and records relationships between the obtained documents and other documents in a document corpus maintained by the processing device, and wherein the NLP engine processes the regulatory documents and generates documents that are easy to understand by the casual users
   incorporating, using the processing device, relationships between the obtained documents and other documents into the personalized regulatory content;
   transmitting, using the communication device, the at least one personalized regulatory content to the user device;
   displaying the at least one personalized regulatory content via five result blocks in a result window on a display screen of the user device;
   wherein a first result block among the five result blocks displays the number of publications associated with the regulatory topic, a second result block among the five result blocks displays the summary of the regulatory topic, a third result block among the five result blocks displays the key dates associated with the regulatory topic, a fourth result block among the five result blocks displays the summary of the latest changes associated with the regulatory topic, a fifth result block among the five result blocks displays the heat map graph associated with the at least one regulatory content; and
   wherein the at least one user characteristic is based on at least one preference associated with at least one other user account, wherein the user account and the at least one other user account share at least one common characteristic, wherein the at least one common characteristic comprises a tier level of an organization.

2. The method of claim 1, wherein the at least one database comprises a plurality of dissimilar databases, wherein the method further comprises transmitting, using the communication device, the search request to each of the plurality of dissimilar databases.

3. The method of claim 1, wherein the at least one user characteristic is based on a user profile and previous user behavior associated with the user account.

4. The method of claim 1 further comprising:
   receiving, using the communication device, user interaction data associated with the at least one regulatory content from a plurality of user devices;
   generating, using the processing device, at least one regulatory insight based on the user interaction data; and
   transmitting, using the communication device, the at least one regulatory insight to the user device.

5. The method of claim 1 further comprising:
   receiving, using the communication, a notification request corresponding to the at least one regulatory insight;
   monitoring, using the processing device, at least one change associated with the at least one regulatory insight;
   generating, using the processing device, at least one updated regulatory insight based on the at least one change; and
   transmitting, using the communication device, the at least one updated regulatory insight to the user device.

6. A system for facilitating searching of regulatory content, the system comprising:
a communication device;
a storage device;
a processing device;
the communication device being configured for receiving a search request from a user device, wherein the search request is associated with a user account;
the storage device being configured for querying at least one database based on the search request;
the processing device being configured for initiating a timer upon receiving the search request and detecting expiry of a predetermined time period based on a state of the timer, wherein the querying of the at least one database is based on the detecting;
the processing device being configured for receiving at least one regulatory content from the storage device based on the querying;
the processing device being configured for analyzing the at least one regulatory content;
the processing device being configured for generating at least one regulatory insight based on the analyzing;
wherein the at least one regulatory insight comprises a number of publications associated with a regulatory topic corresponding to the at least one regulatory content, a summary of the regulatory topic, key dates associated with the regulatory topic, a summary of latest changes associated with the regulatory topic, and a heat map graph associated with the at least one regulatory content;
the storage device being configured for retrieving at least one user characteristic associated with the user account;
the processing device being configured for generating at least one personalized regulatory content based on each of the at least one regulatory content and the at least one user characteristic, wherein the processing device obtains documents related to regulations from multiple resources, and wherein the processing device is configured for including a Neuro-Linguistic Programming (NLP) engine to process the documents obtained, and wherein the NLP engine uses a machine learning to process and learn from the obtained documents, and wherein the NLP engine classifies the obtained documents into multiple classes, and wherein the NLP engine finds and records relationships between the obtained documents and other documents in a document corpus maintained by the processing device, and wherein the NLP engine processes the regulatory documents and generates documents that are easy to understand by the casual users
incorporating, using the processing device, relationships between the obtained documents and other documents into the personalized regulatory content;
the communication device being configured for transmitting the at least one personalized regulatory content to the user device;
displaying the at least one personalized regulatory content via five result blocks in a result window on a display screen of the user device;
wherein a first result block among the five result blocks displays the number of publications associated with the regulatory topic, a second result block among the five result blocks displays the summary of the regulatory topic, a third result block among the five result blocks displays the key dates associated with the regulatory topic, a fourth result block among the five result blocks displays the summary of the latest changes associated with the regulatory topic, a fifth result block among the five result blocks displays the heat map graph associated with the at least one regulatory content; and
wherein the at least one user characteristic is based on at least one preference associated with at least one other user account, wherein the user account and the at least one other user account share at least one common characteristic, wherein the at least one common characteristic comprises a tier level of an organization.

7. The system of claim 6, wherein the processing device is further configured for:
initiating a timer upon receiving the search request; and
detecting expiry of a predetermined time period based on a state of the timer, wherein the querying of the at least one database is based on the detecting.

8. The system of claim 6, wherein the at least one database comprises a plurality of dissimilar databases, wherein the system further comprises transmitting the search request to each of the plurality of dissimilar databases.

9. The system of claim 6, wherein the at least one user characteristic is based on a user profile and previous user behavior associated with the user account.

10. The system of claim 6, wherein the communication device is further configured for:
receiving user interaction data associated with the at least one regulatory content from a plurality of user devices; and
transmitting at least one regulatory insight to the user device, wherein the processing device is further configured for generating the at least one regulatory insight based on the user interaction data.

11. The system of claim 6, wherein the communication device is further configured for:
receiving, using the communication, a notification request corresponding to the at least one regulatory insight; and
transmitting at least one updated regulatory insight to the user device, wherein the processing device is further configured for:
monitoring at least one change associated with the at least one regulatory insight; and
generating the at least one updated regulatory insight based on the at least one change.

* * * * *